(12) United States Patent
Lee et al.

(10) Patent No.: US 7,986,414 B2
(45) Date of Patent: Jul. 26, 2011

(54) MEASUREMENT OF MULTIPLE SURFACE TEST OBJECTS WITH FREQUENCY SCANNING INTERFEROMETER

(75) Inventors: Christopher Alan Lee, Pittsford, NY (US); Mark Joseph Tronolone, Webster, NY (US)

(73) Assignee: Corning Incorporated, Corning, NY (US)

( * ) Notice: Subject to any disclaimer, the term of this patent is extended or adjusted under 35 U.S.C. 154(b) by 440 days.

(21) Appl. No.: 12/363,067

(22) Filed: Jan. 30, 2009

(65) Prior Publication Data

US 2010/0195113 A1    Aug. 5, 2010

(51) Int. Cl.
*G01B 9/02* (2006.01)
(52) U.S. Cl. ........................................ 356/489; 356/516
(58) Field of Classification Search .................. 356/489, 356/516

See application file for complete search history.

(56) References Cited

U.S. PATENT DOCUMENTS

| | | | |
|---|---|---|---|
| 5,402,234 A * | 3/1995 | Deck .............................. | 356/497 |
| 6,690,690 B2 | 2/2004 | Marron | |
| 6,741,361 B2 | 5/2004 | Marron | |
| 7,209,477 B2 | 4/2007 | Pike | |
| 7,259,860 B2 | 8/2007 | Marron et al. | |
| 2006/0061773 A1 | 3/2006 | Lee et al. | |

OTHER PUBLICATIONS

Yamamoto et al; "Surface Shape Measurement by Wavelength Scanning Interferometry Using and Electronically Tuned Ti:Sapphire Laser"; Optical Review; vol. 8; No. 1; (2001) 59-63.

Lu et al; "Measuring large stepl heights by variable synthetic wavelength interferometry"; Meas. Sci. Technol. 13 (2002) 1382-1387.

Hibino et al; "Multiple-surface Testing by a Wavelength-scanning interferometer for refractive index inhomogeneity measurement"; Optics and Spectroscopy, 2006, vol. 101, No. 1, pp. 18-22.

* cited by examiner

*Primary Examiner* — Tari Fur Chowdhury
*Assistant Examiner* — Jonathon Cook
(74) *Attorney, Agent, or Firm* — Timothy M. Schaeberle

(57) ABSTRACT

A frequency scanning interferometer is arranged for simultaneously measuring multiple surfaces of a test object through a wide range of expected offsets. Knowledge of the expected locations of the test surfaces is compared with a sequence of ambiguity intervals based on a synthetic measurement wavelength to center the test surfaces within the ambiguity intervals.

25 Claims, 6 Drawing Sheets

MEASUREMENT OF MULTIPLE SURFACE TEST OBJECTS WITH FREQUENCY SCANNING INTERFEROMETER

TECHNICAL FIELD

The invention relates to frequency-shifting interferometry in which interferometric data is gathered at multiple measuring beam frequencies and to processing methods for exploiting relationships apparent from resulting interference patterns generated at the multiple measuring beam frequencies for measuring optical path length differences between interfering portions of the measuring beams.

BACKGROUND OF THE INVENTION

Interference patterns for measuring test object surface topologies are generally captured as overlapping images of the test surface and a reference surface illuminated by different portions of a common coherent beam of light. Within the coherence length of the two beam portions, the intensity of each pixel within the interference pattern is subject to variation within a cycle of constructive and destructive depending upon the local phases of the beam portions forming the overlapping images.

If one beam portion is required to travel an optical path length slightly more or less than the other beam portion, the coherent wave forms of the two beam portions can arrive at the image plane out of phase with one another. The pixels are the brightest when formed by beam portions that constructively interfere by traveling equal optical path lengths or optical path lengths that differ by an integer multiple of the common wavelength of the beam portions. The pixels are darkest when formed by beam portions that destructively interfere by traveling optical path lengths that differ by one-half of the common wavelength or an integer multiple of the wavelength more so that the beam portions remain 180 degrees out of phase. Thus, pixel intensity can be used as a measure of the local phase difference between the object and reference beams, and the phase difference, as an angular portion of a $2\pi$ wave cycle can be converted into a fractional portion of the beam wavelength, as a variation in distance.

Since each cycle of constructive and destructive interference produces a repetitive pattern of pixel intensity variation, the intensity values of individual pixels within an interference pattern provide measurements limited to one wavelength of the measuring beam, which limit is referred to as an ambiguity interval. The ambiguity interval for measuring surface topographies expressed as a relative height variation between test and reference surfaces is generally limited to one-half wavelength because the height variation measured under reflection doubles the optical path length difference between beam portions. Test surfaces that vary gradually in height by more than one-half wavelength can still be measured by a procedure referred to a "phase unwrapping" by assuming that the variation between adjacent pixels is within the one-half wavelength ambiguity interval. Nonetheless, with ambiguity intervals of less than 400 nanometers for measuring beams within the visible range, only very smooth surfaces qualify for this sort of measurement.

The conversion of pixel intensity to a phase difference between beam portions can be problematic because pixel intensity is subject to a number of influences beyond interference. For example, pixel intensity can vary over the imaging field because of illuminating conditions or even the local reflectivity of the test surface. Phase shifting interferometry has been developed to overcome this problem by forming a succession of interference patterns at incrementally varied optical path length differences to shift each pixel through a cycle of constructive and destructive interference. Thus, the intensity of each pixel can be compared to the range of intensity variation within its own cycle of constructive and destructive interference. Data from as few as three incrementally phase shifted interference patterns can be used to convert pixel intensity into a useable measure of height variation.

Test surfaces with topography variations beyond optical quality, such as machined metal surfaces, are generally not measurable by conventional interferometric methods. For many such surfaces, the pixel-to-pixel intensity variation is so high that interference fringes are not visible within the interference patterns. Phase unwrapping cannot be used to relate the height of pixels to one another across a test surface because the pixel-to-pixel variation between adjacent pixels can exceed the ambiguity interval.

Frequency shifting interferometry is one of the alternative interferometric methods available for measuring "rough" or discontinuous test surfaces, defined as surfaces with adjacent pixel variations exceeding the usual ambiguity interval of conventional interferometers. A sequence of interference patterns are captured by varying the measuring beam frequency between each of the patterns. The rate at which individual pixels vary in intensity between constructive and destructive interference with the variation in beam frequency is known to be a function of the optical path length difference between the object and reference beam portions. The cumulative effect of a change in wavelength is greater over a greater optical path length difference.

Whether the beam frequency is varied incrementally between captured interference frames or the beam frequency is varied continuously and the interference frames are sampled incrementally, the beam frequency difference between the captured interference frames establishes a synthetic wavelength corresponding to an optical path length difference over which a pixel undergoes a single cycle of constructive and destructive interference. The synthetic wavelength, which can be defined as the speed of light divided by the incremental change in beam frequency, can be much longer than the wavelength of the measuring beam and can provide an expanded ambiguity interval.

Larger synthetic wavelengths are preferred for expanding the range of measurement (i.e., increasing the ambiguity interval) and a large number of sample interference frames (i.e., the number of incremental beam frequency steps captured in interference patterns) are preferred for improving the resolution of the measurement (i.e., the smallest height differences that can be discerned). However, together, the size frequency step and the number of frequency steps can be limited by the tunable range of the light source, usually a tunable laser source. Increasing the number of frequency steps increases both the time to capture the interference patterns and the time required to process the captured data.

Test objects with discontinuous surfaces or surfaces that are offset from one another can exceed even the enlarged ambiguity interval of frequency shifting interferometers. Although the offset surfaces can be separately measured, an additional measurement can be required to relate the offset surfaces to each other. The separate measurements of the surfaces and the additional measurement between surfaces can be time consuming and difficult to relate accurately to one another for providing an overall measurement of the test surfaces against a common datum.

SUMMARY OF THE INVENTION

The invention in one or more of its preferred embodiments relates certain "a priori" information about a test object to certain information about a frequency shifting interferometer for mounting the test object relative to the frequency shifting interferometer in a position for simultaneously measuring multiple surfaces that are offset from one another beyond the usual ambiguity interval of the interferometer. The invention can be further qualified for suppressing the influence of error sources on the measurements including systematic intensity variations and the contributions of secondary cavities, i.e., interference patters arising from surfaces not intended for measurement. For many test objects having multiple surfaces, the multiple surfaces can be measured to desired accuracy against a common datum within a single cycle of measurement. Benefits of faster measurements, simplified processing, and lower cost manufacturing can be realized in accordance with the invention.

One expression of the invention as a method of measuring topographical variations in multiple surfaces of a test object with a frequency shifting interferometer includes acquiring information about both the test object and the frequency shifting interferometer. The information acquired about the test object includes the spacing between the multiple surfaces of the test object along a reference axis. The information acquired about the frequency shifting interferometer includes a sequence of ambiguity intervals along a measurement axis within which topographical variations can be unambiguously measured. In addition, exclusion zones adjacent to boundaries between the ambiguity intervals are identified. The test object is mounted with respect to the frequency shifting interferometer so that the multiple surfaces of the test object are located within predetermined ambiguity intervals of the interferometer and outside the exclusion zones.

Sufficient information is acquired about the spacing between the multiple surfaces so that the particular ambiguity intervals with which the individual surfaces are aligned are known. This information allows the ambiguity intervals themselves to be interpreted, and the data acquired within one known ambiguity interval to be compared to the data acquired within another known ambiguity interval and the data from both ambiguity intervals to be compared to a common datum.

Preferably, the test object is mounted with its reference axis in alignment with the measurement axis of the interferometer. The mounting position is preferably set so that the test surfaces are relatively centered within the ambiguity intervals. The ambiguity intervals are derived from a synthetic wavelength associated with a predetermined beam frequency step of the frequency shifting interferometer. In units of local surface height, the ambiguity intervals correspond to one-quarter of the synthetic wavelength. Each of the ambiguity intervals preferably spans a range of pixel intensity modulation frequencies with each if the modulation frequencies corresponding to a number of cycles of constructive and destructive interference over the total range of beam frequency variation.

Subsets of the pixel intensity modulation frequencies are preferably defined as a sequence of separated measuring regions with modulation frequencies approaching one or more boundaries of the ambiguity intervals excluded from the measuring regions. The multiple surfaces of the test object are preferably located within a plurality of the measuring regions.

Each of the ambiguity intervals is associated with a similar set of modulation frequencies limited by the range of different beam frequencies through which the frequency shifting interferometer is stepped for collecting data. Additional modulation frequencies can be excluded from the ambiguity intervals in accordance with expected locations of the test surfaces within the ambiguity intervals. For example, additional information can be acquired concerning ranges of variation beyond which the spacings of the multiple surfaces are not expected to vary and measurement zones matching these ranges can be defined for each of the test surfaces. The test object is then mounted so that the measurement zones of the multiple surfaces of the test object are located outside the exclusion zones. Different sets of pixels corresponding to the different surfaces of the test object can be matched against different sets of modulation frequencies within the measurement zones for determining the modulation frequency closest to the modulation rates of each pixel.

Another expression of the invention involves a method of measuring multiple surfaces of a test object against a common datum. A test object having a plurality of test surfaces is mounted in a position for measurement by a frequency shifting interferometer. The plurality of test surfaces together with a reference surface are imaged with a coherent beam of light forming an interference pattern comparing the test surfaces to the reference surface. A frequency of the measuring beam is incrementally shifted for reimaging the test and reference surfaces and obtaining a succession of different interference patterns at different measuring beam frequencies. Ambiguity intervals based on the incrementally shifted beam frequency correspond to ranges of measurement within which test surface height variations with respect to the reference surface can be unambiguously determined. The test surfaces are collectively positioned within a plurality of the ambiguity intervals so that the test surfaces are spaced from boundaries of the ambiguity intervals.

Preferably, exclusion zones are defined adjacent to the boundaries of the ambiguity intervals and the test surfaces are preferably located outside the exclusion zones of the ambiguity intervals. The incremental shifting of the measuring beam frequency preferably includes shifting the beam frequency through a range of frequencies corresponding to a sum of the incremental frequency shifts. The interference patterns can be captured as arrays of pixel intensities, wherein each of the pixels varies in intensity through conditions of constructive and destructive interference at a modulation frequency.

Each of the ambiguity intervals spans a range of pixel intensity modulation frequencies. Preferably, each of the ambiguity intervals is associated with a similar set of modulation frequencies limited by the number of incremental beam frequency shifts. Modulation frequencies approaching a frequency equal to one-half of the number of incremental beam frequency shifts are preferably excluded from the ambiguity intervals. Modulation frequencies approaching a frequency of zero are also preferably excluded from the ambiguity intervals. Additional modulation frequencies can be excluded from the ambiguity intervals in accordance with expected locations of the test surfaces.

Yet another expression of the invention involves measuring multiple surfaces of a test object with a frequency-shifting interferometer. Data is acquired about the surfaces of a test object including measurement zones are for each of the test surfaces. Ambiguity intervals are determined in relation to a reference surface of the interferometer. A mounting position of the test object is determined in relation to the interferometer for collectively fitting the measurement zones of the test surfaces within individual ambiguity intervals. The test object is mounted in the mounting position, and the ambiguity interval associated with each of the fitted measurement zones is identified. A succession of interference patterns are formed between the test surfaces and the reference surface at incrementally varying measuring beam frequencies. Pixel intensity data from the succession of interference patterns is converted into modulation frequencies and further converted into height variations within and between the test surfaces having regard to the ambiguity intervals in which the test surfaces are located.

The conversion of the pixel intensity data preferably involves excluding data outside the measurement zones. The mounting of the test object preferably includes relatively adjusting the test object with respect to the reference surface of the interferometer for locating the test object in the referenced mounting position.

BRIEF DESCRIPTION OF THE DRAWING FIGURES

Figure 5:
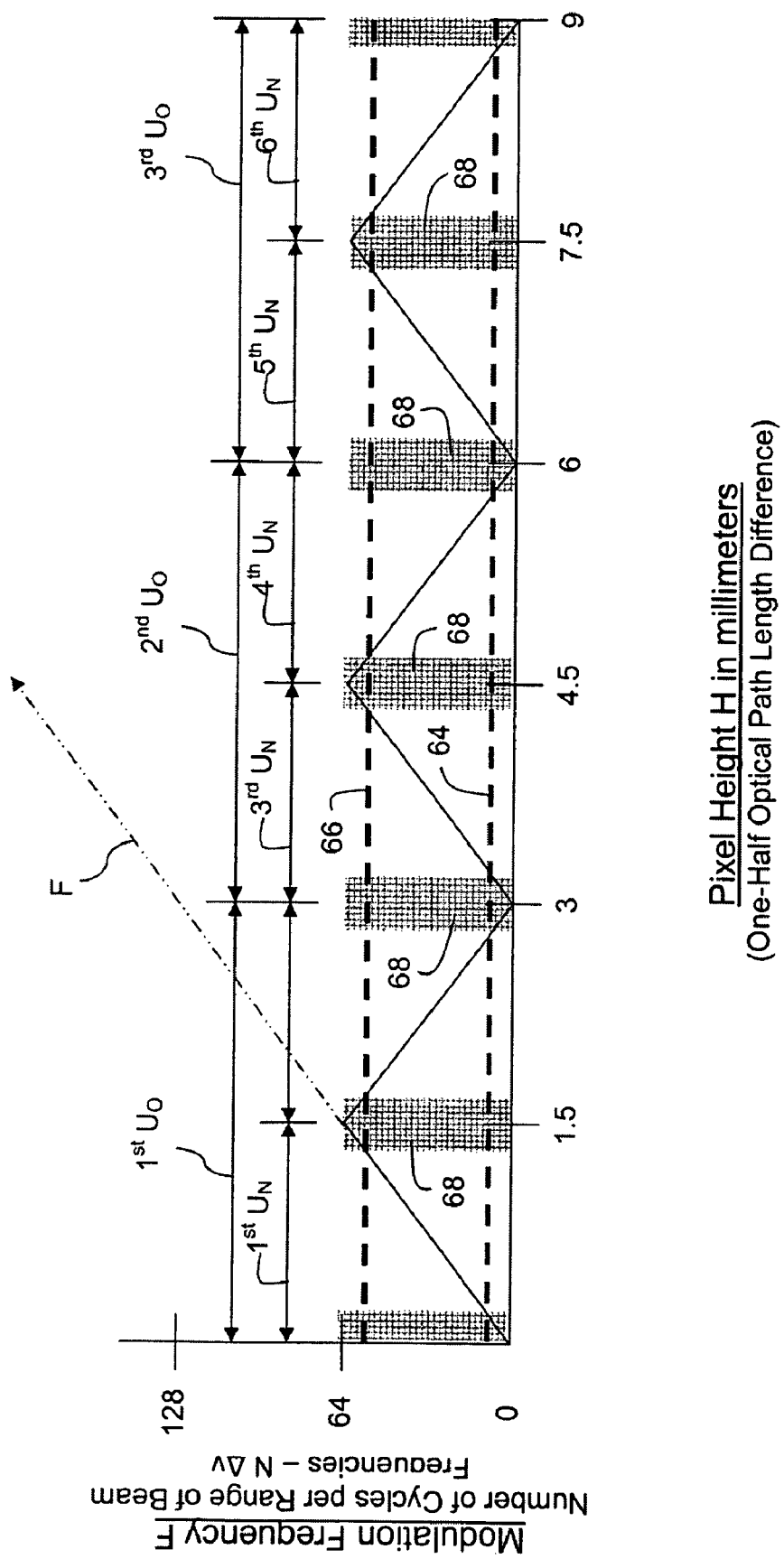
FIG. 5 is a similar graph plotting pixel modulation frequency as a function of pixel height based on a beam frequency step of 50 GHz and a total of 128 beam frequency steps.
Figure 6:
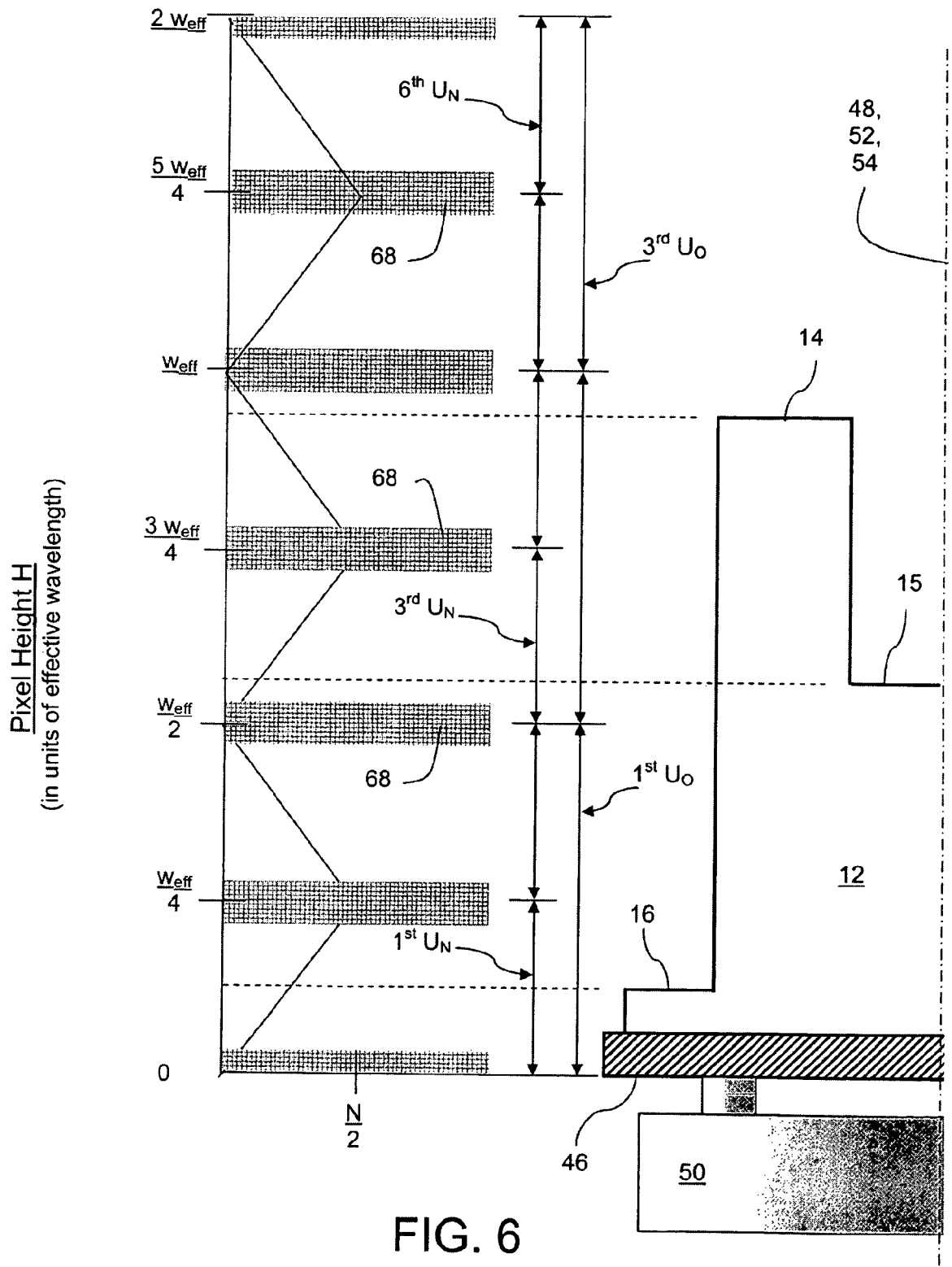

FIG. 6 reorients the graph of FIG. 5 for comparison to the locations of the test surfaces of the test object.

Figure 7:
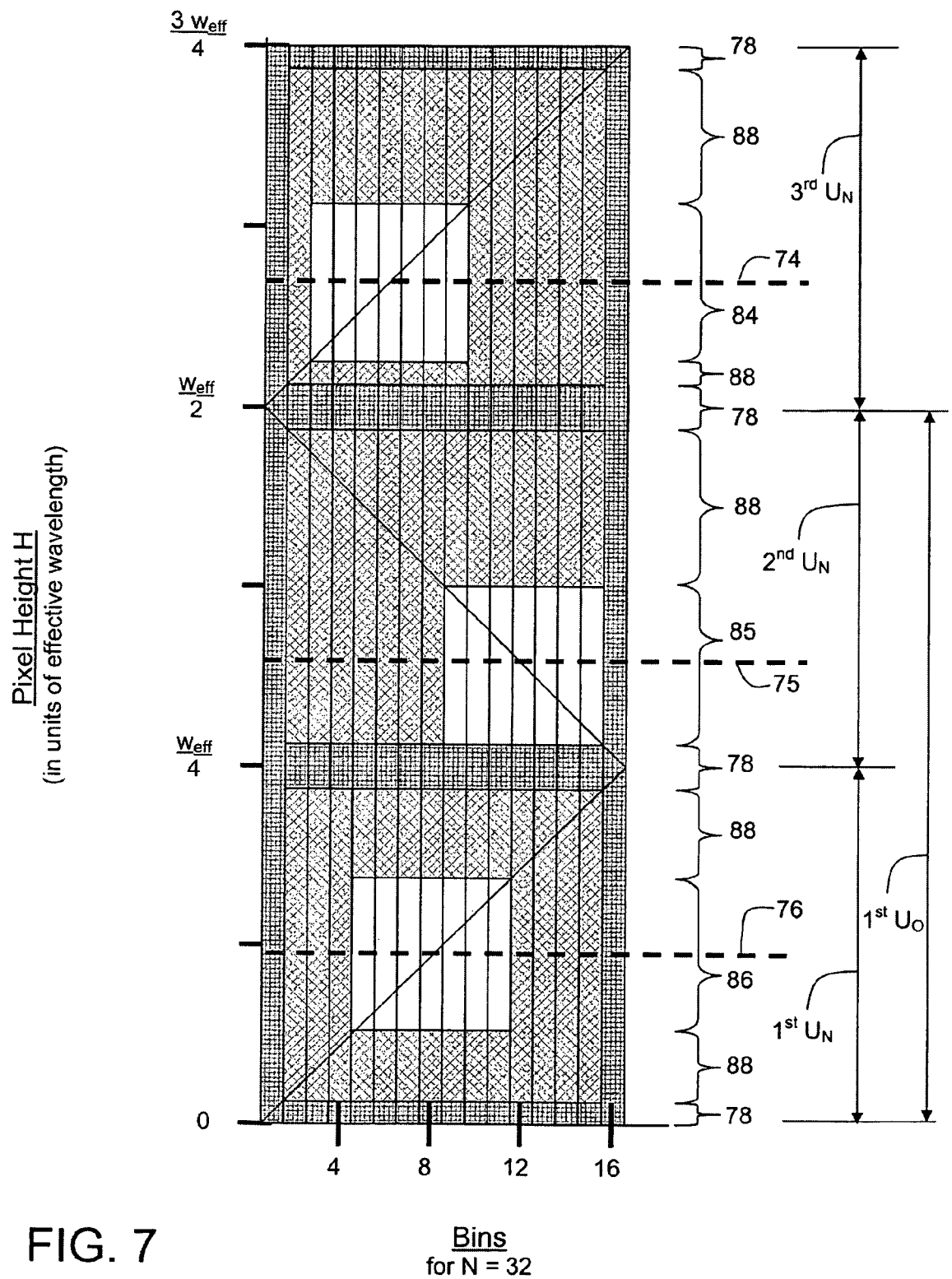

FIG. 7 is an enlarged graph plotting pixel modulation frequencies within a repeating sequence of bins showing limited measurement zones surrounding the expected locations of the test object surfaces.

Figure 8:
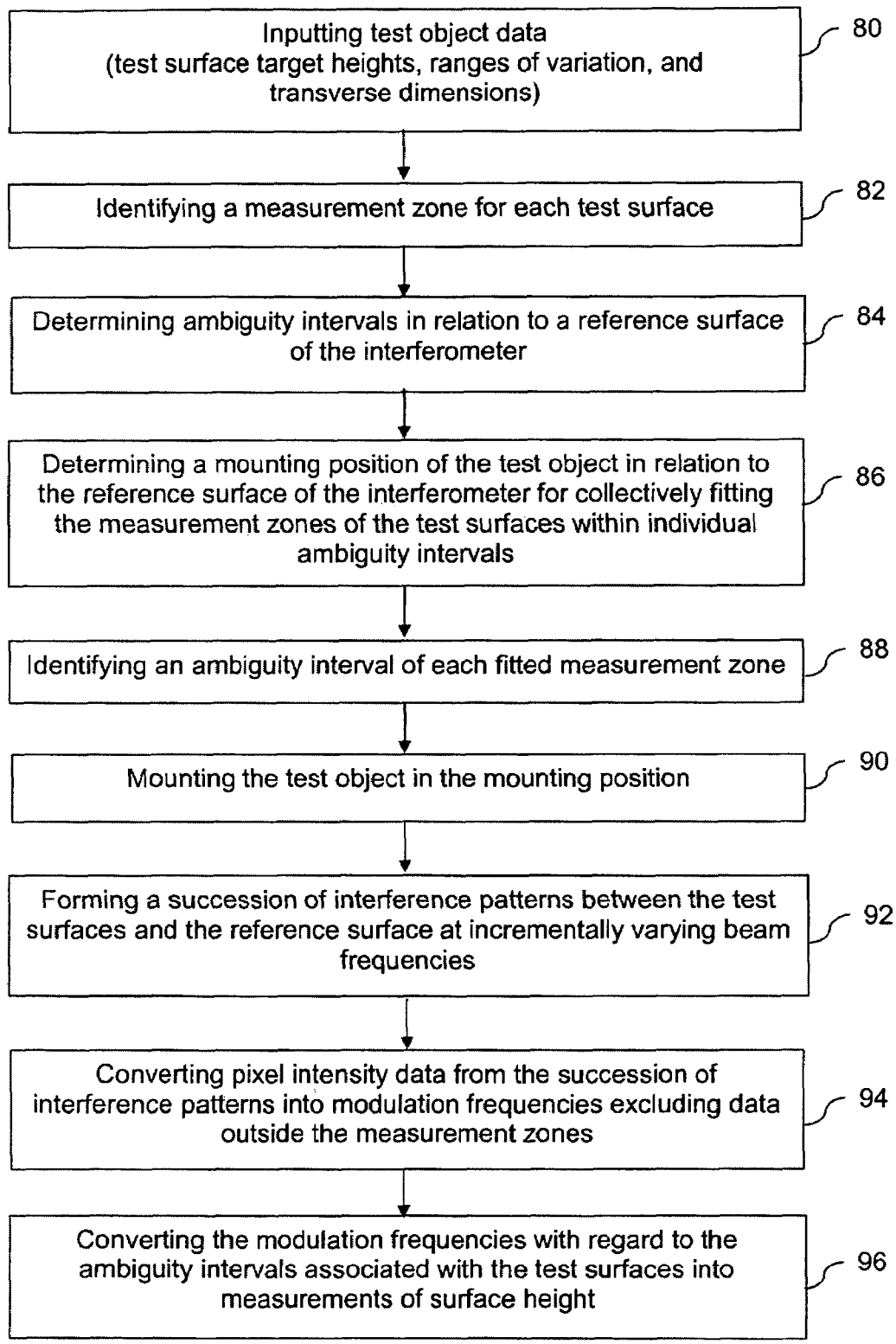

FIG. 8 is a flow chart showing a preferred sequence of steps for carrying out the invention.

DETAILED DESCRIPTION OF THE INVENTION

Figure 1:
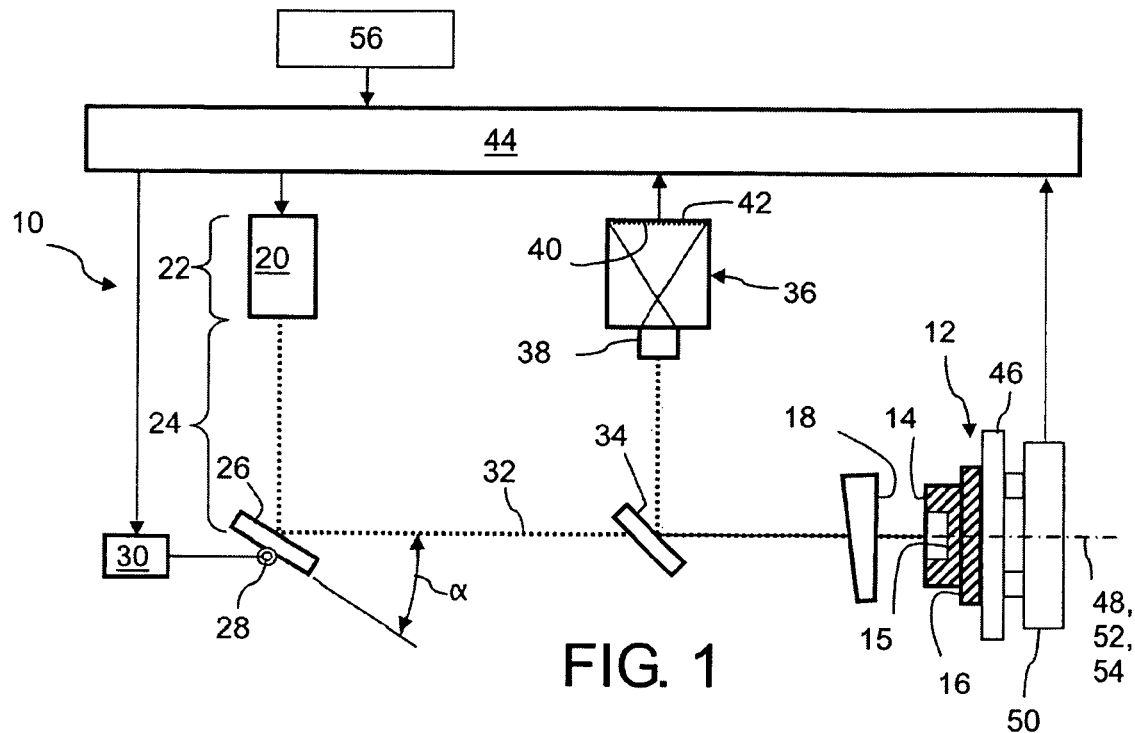
FIG. 1 is a diagram of a frequency shifting interferometer in a Fizeau-type configuration in accordance with an embodiment of the invention.
Figure 2:
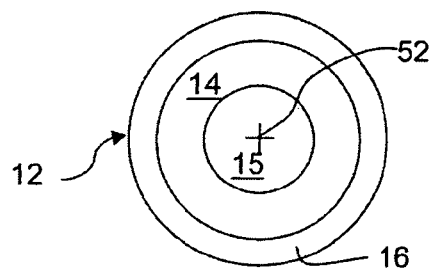
FIG. 2 is a plan view of a test object having three relatively offset surfaces.

A frequency-scanning interferometer 10 is shown in FIG. 1 in a common path (e.g., Fizeau) configuration for measuring a test object 12 having first, second, and third test surfaces 14, 15, and 16 as also shown in FIG. 2. Height variations among points on all three surfaces 14, 15, and 16 are measured in comparison to a reference surface 18 by collecting and evaluating interference data for each of the points at a plurality of measuring beam frequencies.

A preferred coherent light source for the interferometer 10 is a mode-selective frequency-tunable laser 20, which includes a lasing cavity 22 and a feedback cavity 24. A frequency adjuster in a Littrow configuration shown as an angularly adjustable diffraction grating 26 forms one end of the feedback cavity 24 and is adjustable about a pivot axis 28 as directed by a driver 30 through a range of angles α for adjusting the beam frequency output of the frequency-tunable laser 20. The angularly adjustable diffraction grating 26 retroreflects light of a first diffraction order back into the lasing cavity 22 for influencing the lasing frequency subject to the least loss. Different frequencies are returned to the lasing cavity 22 as a function of the inclination angle α of the diffraction grating 26.

For purposes of simplifying data processing operations of the frequency-shifting interferometer 10, the diffraction grating 26 is pivoted through a number of angular positions for selecting among beam frequency modes favored by the lasing cavity 22 for incrementally varying the frequency output of the frequency-tunable laser 20 at intervals of the mode spacing. Zero order reflections from the diffraction grating 26 reflect a measuring beam 32 in a different direction as the output of the frequency-tunable laser 20. A folding mirror (not shown) moves together with the diffraction grating 26 to maintain a single output direction for the measuring beam 32. Such folding mirrors are shown in U.S. Pat. No. 6,690,690, entitled TUNABLE LASER SYSTEM HAVING AN ADJUSTABLE EXTERNAL CAVITY, which is hereby incorporated by reference.

Additional details of such frequency-tunable lasers are given in co-assigned U.S. Pat. No. 7,209,477 entitled MODE-SELECTIVE FREQUENCY TUNING SYSTEM, which is hereby incorporated by reference. Other frequency tunable lasers can also be used in accordance with the invention including continuously tunable lasers, which can be arranged to output a plurality of discrete beam frequencies. A feedback system (not shown), such as described by co-assigned U.S. Pat. No. 7,259,860 entitled OPTICAL FEEDBACK FROM MODE SELECTIVE TUNER and hereby incorporated by reference, can be used to further adjust the output of the frequency-tunable laser or to participate in the subsequent processing of interference data.

The measuring beam 32 output by the frequency tunable laser 20 propagates along a common optical pathway to both the reference surface 18 and the three test surfaces 14, 15, and 16 of the test object 12. One portion of the measuring beam 32 reflects from the reference surface 18 as a reference beam, and another portion of the measuring beam 32 transmits through the reference surface 18 and reflects from the three test surfaces 14, 15, and 16 as an object beam. A beamsplitter 34, which allows for the passage of the measuring beam 32 to both the reference surface 18 and the three test surfaces 14, 15, and 16, directs the returning reference and object beams to a camera 36 that includes both imaging optics 38 and a detector array 40 (e.g., a charge-coupled diode array) for recording interference patterns between the reference and object beams as overlapping images of the three test surfaces 14, 15, and 16 of test object 12 and the reference surface 18.

Figure 3:
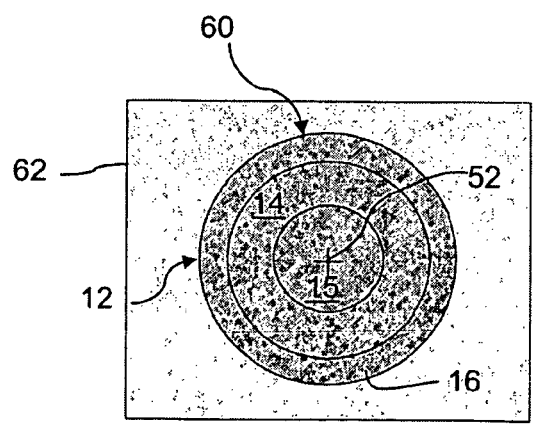
FIG. 3 depicts a camera frame showing a speckle interference pattern taken from overlapping images of three relatively offset surfaces with a reference surface.

Within an image plane 42 overlying the detector array 40, the overlapping images of the three test surfaces 14, 15, and 16 and the reference surface 18 form an interference pattern 60 as shown in FIG. 3. The interference pattern 60 is depicted as a speckled interference pattern reflecting a surface roughness approaching one-half wavelength of the measuring beam or more. A different speckled interference pattern is formed by each of the different measuring beam frequencies output by the frequency tunable laser 20. A computer 44, which also controls both the operation of the laser 20, processes the different interference patterns captured within camera frames 62 on a pixel-by-pixel basis as local measures of beam intensity referenced throughout the image plane 42 of the detector array 40.

Intensity data I(i,j, n) for each pixel (i,j) of the detector array 40 is gathered over the plurality of interference patterns (n=1 to N) as an intensity data set. Within each intensity data set, an individual pixel (i,j) is associated with N intensity values corresponding to the interference patterns produced at N different measuring beam frequencies v.

Calculations, such as Fourier transforms, convert the intensity data sets into approximate topographical measures of local test surface height H(i,j). Fourier transforms can be used to describe the intensity values of each set as a function of the regularly changing beam frequency v in the form of a peak amplitude sinusoid, itself having a modulation frequency F that is directly related to the local height H(i,j) of a corresponding point on one of the test surfaces 14, 15, or 16. Each different local height H(i,j) is associated with a unique modulation frequency F corresponding to the number of cycles of constructive and destructive interference effected in an individual pixel over the range of sampled beam frequencies v and which is evident from the Fourier transform as the frequency F of the peak amplitude sinusoid or as an alias thereof.

Examples of such processing can be found in U.S. Pat. No. 6,741,361 entitled MULTI-STAGE DATA PROCESSING FOR FREQUENCY-SCANNING INTERFEROMETER, which is hereby incorporated by reference. Although the intensity patterns from unevenly spaced measuring beam frequencies can also be transformed into similar measures of local optical path length differences between the reference and object beams, the calculation of approximate local heights H(i,j) of the test object 12 from each set of a single pixel's data can be simplified by generating the different interference patterns at equally spaced beam frequency intervals $\Delta v$ and finding the peak amplitude sinusoid using a Fast Fourier Transform (FFT).

The test object 12 is mounted on a table 46 that is translatable along an axis 48 of a motion stage 50, which is coincident with both a reference axis 52 of the test object 12 and a measurement axis 54 of the interferometer 10. The computer 44 also controls the motion stage 50 for adjusting the position of the three test surfaces 14, 15, and 16 with respect to the reference surface 18. An input device 56 (e.g., a keyboard) to the computer 44 provides for entering information about the test object 12 into the computer 44. For example, the test object 12 is preferably made according to certain specifications that include the relative offset of the test surfaces 14, 15, and 16 along the reference axis 52. It is the offset information that is preferably entered into the computer 44 together with the beam frequency step $\Delta v$ for relatively positioning the test object 12 with respect to the reference surface 18 along the measurement axis 54.

Within the computer 44, the intensity measurements from a number N of captured interference patterns 60 are fit on a pixel-to-pixel basis to the modulation frequency F representing the number of fringes (cycles of constructive and destructive interference) through which the intensity of an individual pixel varies over the entire range of sampled beam frequencies v, calculated as a product of N and $\Delta v$. The number of fringes F over the range of sampled beam frequencies $N\Delta v$ is related to the height H of an individual pixel from the reference surface 18 as follows:

$$F = \frac{2HN\Delta v}{c} \tag{1}$$

where c is the speed of light.

The beam frequency v of the interferometer 10 is shifted in equal frequency steps $\Delta v$ for a total of N number of steps. The frequency step size $\Delta v$ defines an effective wavelength $\lambda_{eff}$ of the modulation frequency F as an optical path length difference between object and reference beams required to shift the intensity of a pixel through one cycle of constructive and destructive interference. The effective wavelength $\lambda_{eff}$ can be calculated as follows:

$$\lambda_{eff} = \frac{c}{\Delta v} \tag{2}$$

Considering a pixel at a height H equal to one-half of the effective wavelength, a total of N frequency steps would result in a modulation frequency F (i.e., number of fringes over the entire beam frequency range of measurement of $N\Delta v$) equal to the number N of frequency samples taken. Thus, a modulation frequency range of zero to N is associated with pixel height variations from zero to one-half of the effective wavelength $\lambda_{eff}$. Although the modulation frequency F progressively increases from N to 2N through the next range of pixel heights from $\frac{1}{2}\lambda_{eff}$ to $\lambda_{eff}$, the higher modulation frequencies F through each successive range of pixel heights are indistinguishable from their counterparts separated by pixel heights equal to an integer multiple of $\frac{1}{2}\lambda_{eff}$. An overall unambiguous pixel height measurement range $U_O$, as limited by the beam frequency step $\Delta v$, is given by the following equation:

$$U_O = \frac{\lambda_{eff}}{2} = \frac{c}{2\Delta v} \tag{3}$$

The overall unambiguous pixel height measurement range $U_O$, also referred to as the overall ambiguity interval, is much larger than one-half of the nominal wavelength of the measuring beam, which is typically 0.5 to 1.0 microns. For example, at a step size $\Delta v$ of 50 GHz, the ambiguity interval is 3.0 millimeters (mm).

Since one full cycle of constructive and destructive interference occurs at a pixel height of $\frac{1}{2}\lambda_{eff}$ over a single frequency step $\Delta v$, a total of N interference cycles occur over the full range of beam frequencies $N\Delta v$ as a frequency F equal to N at the pixel height of $\frac{1}{2}\lambda_{eff}$. However, the highest frequency that can be unambiguously determined from N samples is limited to the Nyquist frequency limit of $\frac{1}{2}N$. Thus, the Nyquist unambiguous pixel height measurement range $U_N$ is given as follows:

$$U_N = \frac{\lambda_{eff}}{4} = \frac{c}{4\Delta v} \tag{4}$$

The modulation frequencies F are measurable between zero and $\frac{1}{2}N$ through a Nyquist unambiguous measurement range $U_N$, which is also referred to as the Nyquist ambiguity interval, of one-quarter of the effective wavelength $\lambda_{eff}$ of the modulation. The Nyquist ambiguity interval $U_N$ is still many times larger (e.g., $\leq 1500$) than the nominal measuring beam wavelength, and measures 1.5 mm at a step size $\Delta v$ of 50 GHz.

In general, a resolution R, with which the height values H can be determined is based on both the effective wavelength $\lambda_{eff}$ and the number N of frequency steps $\Delta v$ sampled as given below:

$$R = \frac{c}{2N\Delta v} = \frac{\lambda_{eff}}{2N} \tag{5}$$

Thus, an increase in the number N of interference samples provides a finer resolution but does not change either the overall ambiguity interval $U_O$ or the Nyquist ambiguity interval $U_N$. The resolution R also corresponds to a pixel height spacing between integer bins of a Discrete Fourier Transform (DFT) that converts the pixel intensity measurements taken over N samples into one or more of a set of $\frac{1}{2}N$ frequency bins. The resolution R multiplied by the frequency bin number m is a measure of pixel height within the Nyquist ambiguity interval $U_N$.

Figure 4:
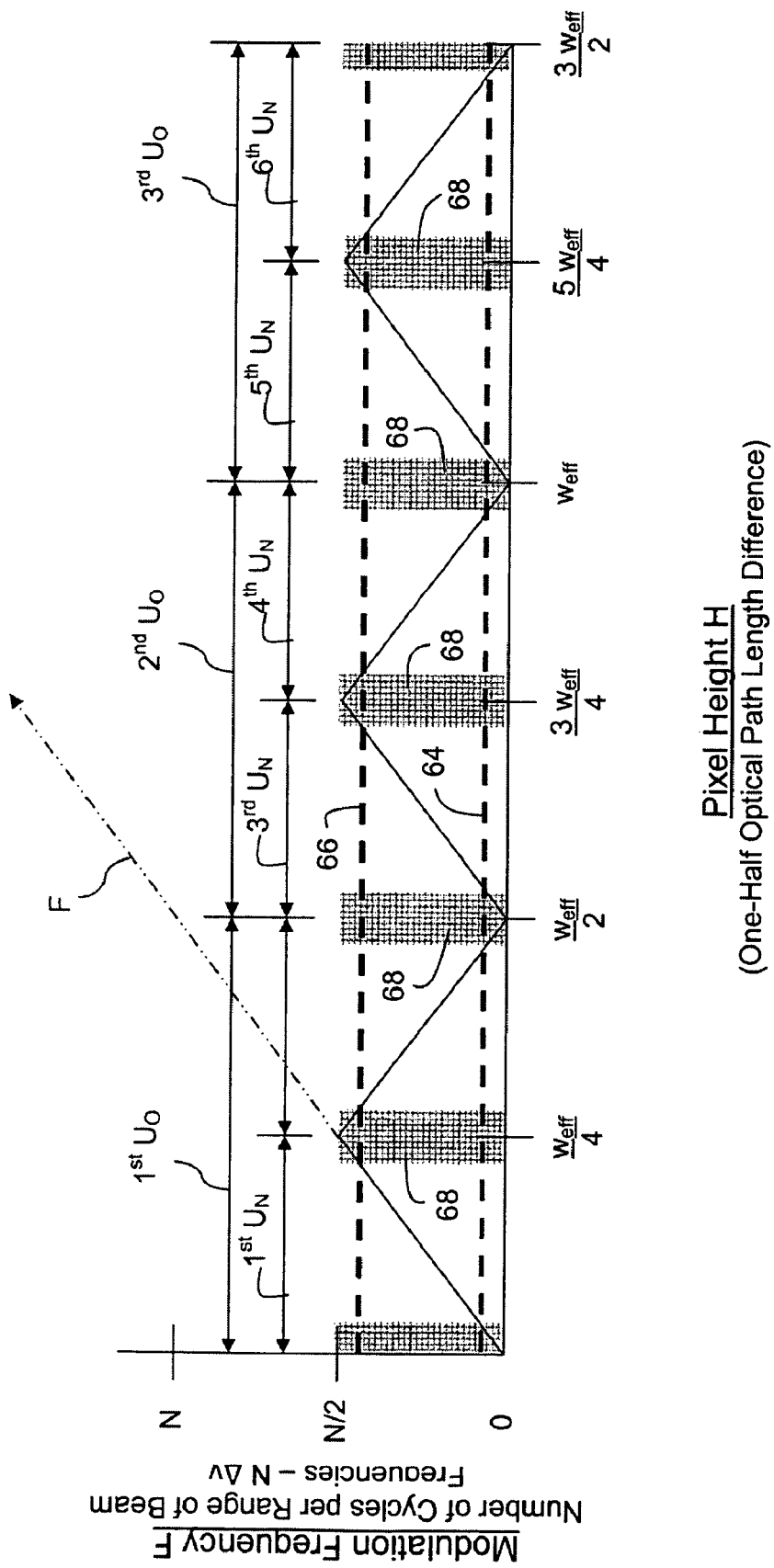
FIG. 4 is a graph plotting pixel modulation frequency as a function of pixel height in units of a synthetic wavelength of the interferometer.

The graph of FIG. 4 plots a truncated modulation frequency F as a function of pixel height H, showing an overall ambiguity interval $U_O$ equal to one-half of the effective wavelength $\lambda_{eff}$ repeated along the abscissa with a maximum distinguishable modulation frequency F of ½N, the Nyquist frequency limit, along the ordinate. At a pixel height H of ½$\lambda_{eff}$ from the reference surface 18, the number of cycles F of constructive and destructive interference (i.e., fringes) through which a pixel undergoes over the full range of beam frequencies N Δv is equal to ½N cycles (see equation 1). The number of cycles F at a pixel height H of ½$\lambda_{eff}$ is equal to N cycles, and the number of cycles F at a pixel height of $\lambda_{eff}$ is equal to 2N cycles, but since the number N of samples is limited, the graph breaks downward at the Nyquist frequency limit of ½N reached at a pixel height of ½$\lambda_{eff}$ (the Nyquist ambiguity interval $U_N$) and repeats the pattern at increments of pixel height of ½$\lambda_{eff}$ (the overall ambiguity interval $U_O$). Thus, as opposed to the result expected from equation (1), the graph does not continue on its original slope but repeatedly breaks midway of the overall ambiguity interval to remain under the Nyquist frequency limit. Even if the number N of samples were unlimited, both the overall ambiguity interval $U_O$ of one-half the effective wavelength $\lambda_{eff}$ and the Nyquist ambiguity interval $U_N$ of one-quarter the effective wavelength $\lambda_{eff}$ would remain unchanged, although the resolution R would approach its finest limit.

Practical considerations exclude measurements of the modulation frequency F near zero and near ½N, the Nyquist frequency limit. Measurements approaching zero modulation below the cutoff line 64 are excluded because too little of the fringe cycle of constructive and destructive interference is sampled over the range of beam frequency variation. Measurements approaching the Nyquist frequency limit above the cutoff line 66 are excluded because too little variation is expressed between measurements. The screen hatching shows zones 68 along the abscissa that are excluded by these practical considerations.

A similar graph of pixel height from a reference surface is plotted in FIG. 5 for a frequency step Δv of 50 GHz through 120 total steps N. One-half of the effective wavelength $\lambda_{eff}$, the overall ambiguity interval $U_O$, is equal to a pixel height of 3 mm. The Nyquist frequency limit at N=64 breaks each of the ½$\lambda_{eff}$ cycles in half producing the Nyquist ambiguity interval $U_N$ through equal ¼$\lambda_{eff}$ sections within which the frequency slopes trend in opposite directions from the midpoint Nyquist frequency limit. Thus, each calculated frequency F between zero and 64 limits the range of pixel height measurements from zero to ¼$\lambda_{eff}$ but potentially corresponds to a first set of pixel heights separated by an integer multiple of ½$\lambda_{eff}$ and a second set of pixel heights offset from each of the first set of pixel heights by the measured pixel height difference from ½$\lambda_{eff}$. For example, a calculated frequency F equal to 16 converts into pixel heights of ⅙$\lambda_{eff}$ and ⁷⁄₁₆$\lambda_{eff}$ within the two halves of the first overall ambiguity interval $U_O$, ⁹⁄₁₆$\lambda_{eff}$ and ¹⁵⁄₁₆$\lambda_{eff}$ within the second overall ambiguity interval $U_O$, and ¹⁷⁄₁₆$\lambda_{eff}$ and ²³⁄₁₆$\lambda_{eff}$ within the third overall ambiguity interval $U_O$.

The cutoff frequencies 64 and 66 as expressed by the exclusion zones 68 limit measurement of pixel heights H approaching an integer multiple of 1.5 mm from the reference surface 18 because either the measurement variation is not sufficient or too little of a modulation cycle is sampled to discern a modulation frequency.

As shown in FIG. 6, test objects, such as the test object 12, with surfaces either spanning or stepped by distances approaching a height difference of one-fourth of the effective modulation wavelength $\lambda_{eff}$ (the Nyquist unambiguous measurement range $U_N$) or more can be adjusted in the height H direction with respect to a reference surface 18 to position the test surfaces 14, 15, and 16 of the test object 12 collectively within useful measuring regions. Often, the overall form of the test object 12 is known in advance and such a priori knowledge of the expected positions of multiple surfaces 14, 15, and 16 can be input into the computer 44 in combination with a priori knowledge of the useful measuring regions to position the multiple surfaces 14, 15, and 16 within the useful measuring regions. The expected range of height variation over the individual test surfaces 14, 15, and 16 can also be considered for test object positioning.

If the location of each surface 14, 15, and 16 on the test object 12 is known within the Nyquist ambiguity interval $U_N$, then it is also possible to know within which ambiguity interval each test surface resides. Thus, modulation frequencies between zero and ½N can be converted into height measurements H between zero and ¼$\lambda_{eff}$ or between ¼$\lambda_{eff}$ to ½$\lambda_{eff}$ depending upon which Nyquist unambiguous measurement range $U_N$ the surface resides and finally scaled by the appropriate multiple of ½$\lambda_{eff}$ based on which overall unambiguous measurement range $U_O$ the surface resides.

In the table below, the pixel intensity data collected from the test object 12 determines the height H of individual pixels within the test surfaces 14, 15, and 16 to within a Fourier frequency bin in the second column between zero and 64 based on a number N of 128 samples.

TABLE 1

| Test Surface | Fourier Bin | Nyquist Interval | Frequency F | Height $\lambda_{eff}$ | Height mm |
|---|---|---|---|---|---|
| 14 | 16 | 4 | 240 | 15/16 | 5.625 |
| 15 | 16 | 3 | 144 | 9/16 | 3.375 |
| 16 | 32 | 1 | 32 | 1/8 | 0.75 |

Based on knowledge of which Nyquist ambiguity intervals $U_N$ the surfaces 14, 15, and 16 reside (see column 3), the corresponding frequency F (see column 4) can be determined. The respective heights H of the surfaces 14, 15, and 16 can be directly calculated by reworking equation (1) as follows:

$$H = \frac{F\lambda_{eff}}{2N} = \frac{Fc}{2N\Delta v} \tag{6}$$

A more complete table equating the measured frequency bins to measurements of height H based on a frequency step Δv of 50 GHz through 120 total steps N follows below.

TABLE 2

Pixel Height H Associated with Fourier Frequency Bins
Beam Frequency Step Δv = 50 GHz Number of Sample Steps N = 128

| | First Overall Ambiguity Interval $U_O$ (0-3 mm) | | | | | | Second Overall Ambiguity Interval $U_O$ (3-6 mm) | | | | | |
|---|---|---|---|---|---|---|---|---|---|---|---|---|
| | First Nyquist Ambiguity Interval $U_N$ (0-1.5 mm) | | | Second Nyquist Ambiguity Interval $U_N$ (1.5-3 mm) | | | Third Nyquist Ambiguity Interval $U_N$ (3-4.5 mm) | | | Fourth Nyquist Ambiguity Interval $U_N$ (4.5-6 mm) | | |
| Bin | F | $\lambda_{eff}$ | H mm | F | $\lambda_{eff}$ | H mm | F | $\lambda_{eff}$ | H mm | F | $\lambda_{eff}$ | H mm |
| 0 | 0 | 0/32 | 0 | 128 | 16/32 | 3.0 | 128 | 16/32 | 3.0 | 256 | 32/32 | 6.0 |
| 8 | 8 | 1/32 | 0.1875 | 120 | 15/32 | 2.8123 | 136 | 17/32 | 3.1875 | 248 | 31/32 | 5.8125 |
| 16 | 16 | 2/32 | 0.375 | 112 | 14/32 | 2.625 | 144 | 18/32 | 3.375 | 240 | 30/32 | 5.625 |
| 24 | 24 | 3/32 | 0.5625 | 104 | 13/32 | 2.4375 | 152 | 19/32 | 3.5625 | 232 | 29/32 | 5.4375 |
| 32 | 32 | 4/32 | 0.75 | 96 | 12/32 | 2.25 | 160 | 20/32 | 3.75 | 224 | 28/32 | 5.25 |
| 40 | 40 | 5/32 | 0.9375 | 88 | 11/32 | 2.0625 | 168 | 21/32 | 3.9375 | 216 | 27/32 | 5.0625 |
| 48 | 48 | 6/32 | 1.125 | 80 | 10/32 | 1.875 | 176 | 22/32 | 4.125 | 208 | 26/32 | 4.875 |
| 56 | 56 | 7/32 | 1.3125 | 72 | 9/32 | 1.6875 | 184 | 23/32 | 4.3125 | 200 | 25/32 | 4.6875 |
| 64 | 64 | 8/32 | 1.5 | 64 | 8/32 | 1.5 | 192 | 24/32 | 4.5 | 192 | 24/32 | 4.5 |

Table 2 demonstrates, as the graphs of FIGS. 4 and 5 illustrate, that the increase in bin number from zero to 64 (½N) within the odd Nyquist ambiguity intervals $U_N$ corresponds to an increase in both modulation frequency F and in pixel height H but the same increase in bin number from zero to 64 (½N) within the even Nyquist ambiguity intervals $U_N$ corresponds to a decrease in both modulation frequency F and in pixel height H. Thus, it is especially important to know whether the test surfaces 14, 15, and 16 lie within odd or even Nyquist ambiguity intervals $U_N$ for appropriately converting the measures of pixel intensity variation into measures of height.

The translation stage 50, particularly as shown in FIG. 6, can be used to collectively center the three test surfaces 14, 15, and 16 within respective Nyquist ambiguity intervals $U_N$ to avoid aligning one or more of the surfaces 14, 15, or 16 with one of the exclusion zones 68. The surface 16 is shown exactly centered within the first Nyquist ambiguity interval $U_N$. The surfaces 14 and 15 are shown within the fourth and third Nyquist ambiguity intervals $U_N$ in positions spaced equally from their closest exclusion zones 68. Thus, the centering operation performed by adjusting the relative position of the test object 12 along the measurement axis 54 of the interferometer 10 does not necessarily result in all three surfaces 14, 15, and 16 exactly centered within their respective Nyquist ambiguity intervals $U_N$. Compromises are preferably made where necessary to best avoid the exclusion zones 68.

Since the test surfaces 14, 15, and 16 are known to be located outside the exclusion zones 68, either the considered results of the Discrete Fourier Transform (DFT) can be limited to modulation frequency bins within the remaining measuring regions or the range of modulation frequencies sampled by the Discrete Fourier Transform (DFT) can be limited to the remaining modulation frequencies outside the exclusion zones 68. The bin limiting of the DFT operation can speed processing and lead to more certain outcomes even for low reflectivity test surfaces, because the exclusion of the frequency bins near the highest and lowest frequencies suppresses error sources including systematic intensity variations and secondary cavities.

More specific knowledge of the locations of the surfaces 14, 15, and 16 enables the exclusion of additional bins, including bins within otherwise ideal measuring regions. Since the DFT is performed separately for each pixel, different ranges of bins can be sampled for each of the surfaces 14, 15, and 16. For example, if the surface 14 is known to be located closer to the fifth Nyquist ambiguity interval $U_N$ than to the fourth Nyquist ambiguity interval $U_N$, the exclusion zone 68 between the third and fourth Nyquist ambiguity intervals $U_N$ can be expanded into the fourth Nyquist ambiguity interval $U_N$ to eliminate other bins from consideration and thereby exclude other potential sources of error from the measurement.

FIG. 7 illustrates the centering of three differently spaced test surfaces 74, 75, and 76 of a test object (not otherwise shown) within more limited subsets of modulation frequency bins based upon expectations about the relative height of the test surfaces 74, 75, and 76. Considered at the same beam frequency step Δv of 50 GHz, but through a total N of only 32 steps, each integer frequency bin of FIG. 7 covers a range of pixel heights through 0.09375 mm, which is equivalent to the resolution R (½$\lambda_{eff}$ of 3 divided by N of 32). The Nyquist limit is reached at a modulation frequency of 16 through the height of 1.5 mm. Integer modulation frequency bins 1 and 16 are eliminated by categorizing the bins within exclusion zones 78 approaching the boundary modulation frequencies within each of the three Nyquist ambiguity intervals $U_N$. The three surfaces 74, 75, and 76 are preferably collectively centered within the remaining portions of the Nyquist ambiguity intervals $U_N$ so that the expected location of each of the surfaces 74, 75, and 76 is spaced apart from the exclusion zones 78.

Additional bins can be excluded based on (a) the target locations of the three surfaces 74, 75, and 76 within the remaining portions of the Nyquist ambiguity intervals $U_N$ and (b) tolerances beyond which the surfaces 74, 75, and 76 are not expected to vary in height. For example, it may be known that the heights H of the surfaces 74, 75, and 76 are not expected to vary from their target height $H_T$ values by more than 0.25 mm, which is within the range three integer-frequency bins. Thus, given a target frequency bin, the heights H of the surfaces can be expected to be found within three frequency bins more or less than the target frequency bin. Measurement zones 84, 85, and 86 can be defined for each of the surfaces 74, 75, and 76, respectively centered at their target frequency bins and each spanning a subset of seven integer-frequency bins. The remaining frequency bins occupy extended exclusion zones 88, which are located between the measurement zones 84, 85, and 86 their adjacent exclusion zones 78.

Given information about a test object including target heights $H_T$ for the three surfaces 74, 75, and 76, tolerances for each of the surfaces 74, 75, and 76 beyond which the heights H of the three surfaces 74, 75, and 76 are not expected to vary and information about the interferometer 10 including the beam frequency step size Δv and the number of steps N as the inputs below, the measurement zones 84, 85, and 86 can be defined for each of the surfaces 74, 75, and 76 as unique ranges of integer modulation frequency bins within each of the Nyquist ambiguity intervals $U_N$ in which the test surfaces 74, 75, and 76 reside.

| Inputs from Test Object | | |
|---|---|---|
| Test Surface | Target Height | Tolerance |
| 74 | 3.56 mm | +/−0.25 mm |
| 75 | 1.97 mm | +/−0.25 mm |
| 76 | 0.75 mm | +/−0.25 mm |

| Inputs from Interferometer | |
|---|---|
| Frequency Step Size | Number of steps |
| 50 GHz | 32 |

As shown in Table 3 below, the measurement zones 84, 85, and 85 can be calculated as unique ranges of integer-frequency bins that can be sampled for separately measuring the unique heights H of pixels associated with each of the test surfaces 74, 75, and 76.

TABLE 3

| Test Surface | Target Height | Meas. Range (mm) | Nyquist Interval | Target Freq. | Meas. Bins |
|---|---|---|---|---|---|
| 74 | 3.56 | 3.28125–3.84375 | 3 | 38 | 3-9 |
| 75 | 1.97 | 1.6875–2.25 | 2 | 21 | 9-15 |
| 76 | 0.75 | 0.46875–1.03125 | 1 | 8 | 5-11 |

Out of a total of 16 integer frequency bins based on the sample size of 32, the measurement zones 84, 85, and 86 for each of the test surfaces 74, 75, and 76 are limited to a range of seven frequency bins, although the particular sequences of frequency bins varies between the measurement zones 84, 85, and 86. Since each of the three test surfaces 74, 75, and 76 is imaged to a unique set of pixels, the pixels known to be associated with each of the test surfaces 74, 75, and 76 can be separately processed within their different measurement zones 84, 85, and 86. In addition, the tolerances for the test surfaces 74, 75, and 76 can differ from one another so that the ranges of considered frequency bins can also differ between the test surfaces. Thus, the tolerances can also be taken into account in setting the height of the test object for locating the test surfaces in positions so that not only the relative heights of the test surfaces avoid the exclusion zones 78 but the ranges of expected test surface height variations for each of the test surfaces also avoid the exclusion zones 78.

For processing the sets of information from the interference patterns, the intensity values I(i,j,n) for each pixel in the detector array 40 can be bias corrected and normalized to one and related to its height H as a function of its modulation as follows:

$$I'(i, j, n) = \cos\left(\frac{4\pi nH}{\lambda_{eff}}\right) \quad (7)$$

where I'(i,j,n) is the normalized intensity value at a pixel (i,j) recorded at the $n^{th}$ measuring beam frequency. The quantity $(4\pi H/\lambda_{eff})$ corresponds to a phase shift in radians accompanying each shift in beam frequency through Δv. Through a total of N phase shifts, the individual pixels I'(i,j) can be expected to undergo a total of F 2π cycles of constructive and destructive interference as set forth in the equation below:

$$F = \frac{2HN}{\lambda_{eff}} \quad (8)$$

which equation (8) is a restatement of equation (1) by substitution of equation (2).

A discrete Fourier transform for assessing the frequency components of a set I'(n) of the normalized intensity values for a given pixel (i,j) is given as follows:

$$K'(m) = \sum_{n=1}^{N} I'(n)\exp[-i2\pi(n-1)(m-1)/M] \quad (9)$$

where M is the total number of frequency component samples distributed evenly throughout Fourier frequency space, m denotes one of the frequency components ordered from 1 to M throughout the Fourier frequency space, and K'(m) measures how well each of the m ordered individual frequency components samples (also referred to as the frequency bins) matches the interference frequency of the recorded data point intensities I'(n) of each pixel (i,j).

Beyond merely ignoring data in bins outside the measurement zones 84, 85, and 86 as shown conceptually, the Fourier transform can be optimized for each of the measurement zones 84, 85, and 86. Known mathematical techniques including the zero padding of adjacent bins provides for use of higher density bin spacing and faster processing by only calculating the bins within the measurement zones 84, 85, and 86.

For example, considering a number of measurements N of 32, where the modulation frequency F is expected to be between 6 and 10 fringes within the N/2 range of its odd ambiguity interval, the number M of Fourier frequency samples can be increased to 128 while calculating values only for bins 24 through 39. By exploiting the expected range of modulation frequencies F, a higher bin density can be sampled with fewer measurements. The resulting amplitudes from bins adjacent to the highest amplitude bin can also be used through known interpolation techniques (e.g. center of gravity) to achieve sub-bin resolution of the modulation frequency.

An exemplary method for measuring test objects with multiple surfaces is laid out in FIG. 8 as a series of steps beginning with the step 80 of inputting of data about a test object, such as the test object 12 of FIG. 1. The data, which can be input into the computer 44 through the input device 56 such as within a form field of a controlling computer program, preferably includes target heights for the individual test surfaces 14, 15, and 16 (or test surfaces 74, 75, and 76 of FIG. 7) along with ranges of heights beyond which the test surface heights are not expected to vary. In addition, the data also preferably includes transverse dimensions of the test surfaces 14, 15, and 16 for distinguishing among the surfaces within the intended field of view.

In step 82, measurement zones, such as the measurement zones 84, 85, and 86 of FIG. 7 are identified for each of the test surfaces 14, 15, and 16 (or 74, 75, or 76) encompassing the limited ranges of height within which the individual test surfaces 14, 15, and 16 are expected to be found based on the data input during the preceding step. Ambiguity intervals $U_N$ are defined with respect to the reference surface 18 of the interferometer 10 in step 84 based on the beam frequency step size $\Delta v$ through which the measuring beam 32 is stepped for taking successive measurements (see, for example equation (4)). Combining the information about the test object 12 and the interferometer 10 in step 86, a preferred mounting position of the test object 12 in relation to the reference surface 18 of the interferometer 10 is determined by collectively fitting the measurement zones 84, 85, and 86 of the test surfaces within individual ambiguity intervals $U_N$. As a part of the fitting process, exclusion zones 68 or 78 are preferably defined adjacent the boundaries of the ambiguity intervals $U_N$ and the measurement zones 84, 85, and 86 are preferably located apart from the exclusion zones 68 or 78 as much as possible. Step 88 records the ambiguity interval $U_N$ within which each of the test surfaces 14, 15, and 16 is intended to be located. In step 90, the test object 12 is mounted in the interferometer 10, preferably on the mounting stage 50 adjusted along the common axes 48, 52, and 54 for locating the test object 12 in the preferred mounting position determined in step 86.

During the measurement operation beginning as step 92, interference patterns between the test surfaces 14, 15, and 16 and the reference surface 18 are formed and captured as pixel arrays of intensity data at each of a succession of measurement beam frequencies. Within the computer 44 at step 94, the pixel intensity data from the interference patterns is converted into modulation frequencies F describing the rates at which the individual pixels transition through cycles of constructive and destructive interference through the progression of beam frequencies. Data related to modulation frequencies F outside the measurement zones 84, 85, and 86 can be excluded from the conversions to exclude error sources and improve the speed and accuracy of the conversions. In the succeeding step 96, the modulation frequencies F of the individual pixels associated with the different test surfaces 14, 15, and 16 are associated with the known ambiguity intervals $U_N$ of the test surfaces to resolve measures of the respective heights of the pixels within each of the test surfaces.

While the invention has been shown and described with references to a limited number of embodiments, it will be understood by those skilled in the art that various changes in form and details may be made without departing from the scope of the invention as set forth in the appended claims. As such, the invention can be embodied in a variety of other ways as more generally taught. For example, the invention can be similarly practiced using two-arm interferometers, including Michelson and Mach-Zehnder configurations arrange for performing frequency-shifting interferometry. The test objects subject to measurement can include more or less test surfaces.

In place of inputting data concerning the target locations of the test surfaces of the test object, measurements approximating test surface locations can be made. Additional measurements or processing of the same interference data can be used to distinguish the different transverse dimensions of the test surfaces to identify the ambiguity intervals within which the individual pixels can be classified. For example, co-assigned U.S. Pat. No. 7,286,238, which is hereby incorporated by reference, discloses a method for distinguishing different regions of a test object with a frequency-shifting interferometer.

The invention claimed is:

1. A method of preparing for measuring topographical variations in multiple surfaces of a test object comprising:
   acquiring information concerning a spacing between the multiple surfaces of the test object along a reference axis,
   acquiring information concerning a sequence of ambiguity intervals of a frequency shifting interferometer along a measurement axis within which topographical variations can be unambiguously measured,
   identifying exclusion zones adjacent to boundaries between the ambiguity intervals, and
   mounting the test object with respect to the frequency shifting interferometer so that the multiple surfaces of the test object are located within predetermined ambiguity intervals of the interferometer and outside the exclusion zones.

2. The method of claim 1 in which the step of mounting includes mounting the reference axis of the test object in alignment with the measurement axis of the interferometer and setting the mounting position so that the test surfaces are relatively centered within the ambiguity intervals.

3. The method of claim 1 in which the step of acquiring information concerning a sequence of ambiguity intervals includes deriving the ambiguity intervals from a synthetic wavelength associated with a predetermined beam frequency step of the frequency shifting interferometer.

4. The method of claim 3 in which the ambiguity intervals in units of local surface height correspond to one-quarter of the synthetic wavelength.

5. The method of claim 1 in which each of the ambiguity intervals spans a range of pixel intensity modulation frequencies each associated with a number of cycles of constructive and destructive interference over a range of beam frequency variation.

6. The method of claim 5 including a step of associating subsets of the pixel intensity modulation frequencies as a sequence of measuring regions with modulation frequencies within the exclusion zones excluded from the measuring regions.

7. The method of claim 6 in which the step of mounting the test object with respect to the frequency shifting interferometer includes locating the multiple surfaces of the test object within a plurality of the measuring regions.

8. The method of claim 7 including a step of identifying a more limited subset of modulation frequencies that surround the expected location of at least one of test surfaces within the ambiguity intervals.

9. The method of claim 8 in which the step of identifying the more limited subset of modulation frequencies includes identifying a more limited subset of modulation frequencies that surround the expected location of each of test surfaces within the ambiguity intervals.

10. The method of claim 9 in which the more limited subsets of modulation frequencies associated with the different test surfaces differ from one another.

11. The method of claim 5 in which each of the ambiguity intervals is associated with a similar set of modulation frequencies limited by a range of different beam frequencies at which interference data is collected.

12. The method of claim 11 including a step of excluding modulation frequencies from the ambiguity intervals in accordance with expected locations of the test surfaces within the ambiguity intervals.

13. The method of claim 12 in which different modulation frequencies are excluded from different ambiguity intervals in accordance with the expected locations of the test surfaces within the ambiguity intervals.

14. The method of claim 1 in which the step of acquiring information concerning a spacing between the multiple surfaces of the test object includes acquiring information concerning ranges of variation beyond which the spacings of the multiple surfaces are not expected to vary and defining corresponding measurement zones for each of the test surfaces.

15. The method of claim 14 in which the step of mounting the test object with respect to the frequency shifting interferometer includes mounting the test object so that the measurement zones of the multiple surfaces of the test object are located outside the exclusion zones.

16. A method of measuring multiple surfaces of a test object against a common datum comprising:
mounting a test object having a plurality of test surfaces in a position for measurement by a frequency shifting interferometer,
imaging the plurality of test surfaces together with a reference surface with a coherent beam of light forming an interference pattern comparing the test surfaces to the reference surface,
incrementally shifting a frequency of the measuring beam for reimaging the test and reference surfaces and obtaining a succession of different interference patterns at different measuring beam frequencies, and
defining a set of ambiguity intervals associated with the incrementally shifted frequency corresponding to ranges of measurement within which test surface height variations with respect to the reference surface can be unambiguously determined,
wherein the step of mounting the test object includes collectively positioning the test surfaces within a plurality of the ambiguity intervals so that the test surfaces are spaced from boundaries of the ambiguity intervals.

17. The method of claim 16 including a step of defining exclusion zones adjacent to the boundaries of the ambiguity intervals and the step of mounting includes positioning the test surfaces outside the exclusion zones of the ambiguity intervals.

18. The method of claim 16 in which the step of incrementally shifting the frequency of the measuring beam includes shifting the frequency of the measuring beam through a range of frequencies corresponding to a sum of the incremental frequency shifts and including a step of capturing the interference patterns as arrays of pixel intensities, wherein each of the pixels varies in intensity through conditions of constructive and destructive interference at a modulation frequency over the range of beam frequencies and each of the ambiguity intervals spans a range of pixel intensity modulation frequencies.

19. The method of claim 18 in which each of the ambiguity intervals is associated with a similar set of modulation frequencies limited by a number of the captured interference patterns.

20. The method of claim 19 including a step of excluding modulation frequencies from the ambiguity intervals approaching a frequency equal to one-half of the number of captured interference patterns.

21. The method of claim 20 in which the step of excluding includes excluding modulation frequencies from the ambiguity intervals approaching a frequency of zero.

22. The method of claim 21 in which the step of excluding includes excluding additional modulation frequencies from the ambiguity intervals in accordance with expected locations of the test surfaces.

23. A method of measuring multiple surfaces of a test object with a frequency-shifting interferometer comprising:
acquiring data regarding test surfaces of a test object,
identifying a measurement zone for each of the test surfaces,
determining ambiguity intervals in relation to a reference surface of the interferometer,
determining a mounting position of the test object in relation to the interferometer for collectively fitting the measurement zones of the test surfaces within individual ambiguity intervals,
identifying the ambiguity interval associated with each of the fitted measurement zones,
mounting the test object in the mounting position,
forming a succession of interference patterns between the test surfaces and the reference surface at incrementally varying measuring beam frequencies,
converting pixel intensity data from the succession of interference patterns into modulation frequencies, and
converting the modulation frequencies with regard to the ambiguity intervals into measurements of the height variations within and between the test surfaces.

24. The method of claim 23 in which the step of converting pixel intensity data includes excluding data outside the measurement zones.

25. The method of claim 23 in which the step of mounting includes relatively adjusting the test object with respect to the reference surface of the interferometer for locating the test object in the mounting position.

* * * * *